Sept. 17, 1957     J. M. KERR     2,806,559
BRAKE DRUM
Filed Feb. 15, 1954
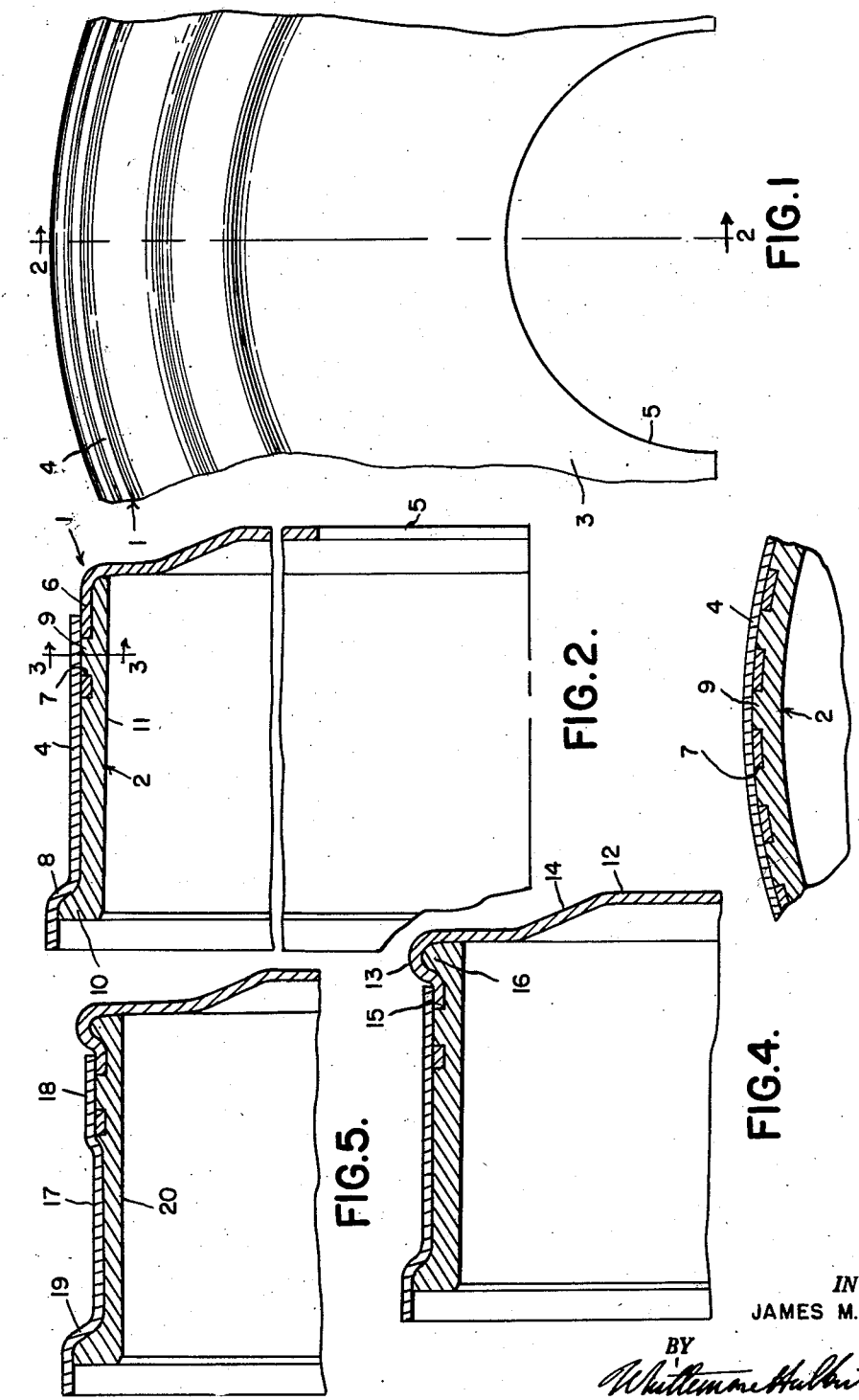
INVENTOR.
JAMES M. KERR
BY
ATTORNEYS

United States Patent Office 2,806,559
Patented Sept. 17, 1957

2,806,559

BRAKE DRUM

James M. Kerr, Detroit, Mich., assignor to Kelsey-Hayes Company, a corporation of Delaware Application February 15, 1954, Serial No. 410,191

8 Claims. (Cl. 188—218)

The invention relates to brake drums and refers more particularly to brake drums for use with motor vehicles.

The invention has for one of its objects to provide a brake drum which is simple in construction and economical to manufacture.

The invention has for another object to provide a simple construction of shell and brake lining securing the parts of the shell together.

The invention has for a further object to provide a brake drum comprising a web and a ring in telescoping relation and a brake lining fused to the web and ring and securing the same together.

These and other objects of the invention will become apparent from the description and claims taken in connection with the accompanying drawings in which:

Figure 1 is an elevation of a portion of a brake drum embodying the invention;

Figure 2 is a cross section on the line 2—2 of Figure 1;

Figure 3 is a cross section on the line 3—3 of Figure 2;

Figures 4 and 5 are views similar to Figure 2 showing modifications.

The brake drums as illustrated are particularly applicable for use with motor vehicles and in general comprise shells rotatable with the motor vehicle wheels and brake shells having brake surfaces for engagement by brake frictional elements.

As shown in Figures 1, 2 and 3 the brake drum comprises the shell 1 and the brake lining 2. The shell has the sheet metal web 3, and the sheet metal ring 4. The web is a stamping having the central hole 5 for receiving the barrel of the hub of the motor vehicle wheel and the peripheral axially extending flange 6. The ring is preferably formed by hooping a rectangular blank, welding the ends of the hooped blank and then sizing the resulting annulus to telescope over the flange 6 with a press fit. The flange 6 is formed with the circumferentially spaced openings 7 located within the ring and the ring is formed with the enlarged free end 8.

The brake lining 2 is formed of cast metal fused to both the flange 6 and the ring 4 and having the projections 9 filling the openings 7 and fused to the ring, and the annular flange 10 partly filling the enlarged end 8 of the ring, the projections and annular flange engaging the shoulders formed by the openings and enlarged end and serving in addition to the molecular bond between the brake lining and the web and the ring to secure the web and ring together.

The web 3 and the ring 4 are assembled in predetermined telescoping relation and placed in a revoluble head of a centrifugal casting machine. The web and ring may be preheated before insertion into the head or heated after insertion to a temperature of approximately 1500° F. Then cast iron at a temperature of approximately 2800° F. is poured into the shell formed by the web and ring while the head is being revolved and fuses with web and ring. The amount of formed cast iron is predetermined to minimize the amount of machining required to secure the cylindrical brake surface 11.

The brake drum of Figure 4 is the same as that of Figures 1, 2 and 3 with the exception that the sheet metal web 12 is formed with the return bent bead 13 joining the disk 14 and the peripheral flange 15 and the cast metal brake annulus or lining has an annular flange 16 filling and fused to the bead.

Figure 5 shows another brake drum having in addition to the construction of Figure 4, the sheet metal ring 17 formed with the enlarged telescoping end 18 as well as the enlarged free end 19 and the cast metal brake annulus or lining 20 engaging and fused to the shoulders formed by these ends.

From the above description it will be seen that I provided a brake drum which is simple in construction and economical to manufacture and in which the brake annulus or lining provides an efficient frictional brake surface and effectively secures the parts of the shell together.

What I claim as my invention is:

1. A brake drum comprising a web having a peripheral flange, a ring telescoping and extending beyond said flange, said flange and ring having shoulder forming means providing shoulders internally of the brake drum facing away from each other, and a brake annulus within said flange and ring engaging said shoulders and securing said flange and ring together.

2. A composite brake drum comprising a sheet metal web having a peripheral apertured flange, a sheet metal ring encircling and extending beyond said flange, said ring having enlarged end portions providing longitudinally spaced shoulders, and a cast metal brake annulus within said flange and ring and extending through said flange and engaging said shoulders.

3. A composite brake drum comprising a sheet metal web having a peripheral bead and a terminal annular apertured flange, a sheet metal ring encircling and extending beyond said flange, said ring having enlarged end portions providing longitudinally spaced shoulders, and a cast metal brake annulus within said bead, flange and ring and extending through said flange and engaging said shoulders.

4. A composite brake drum comprising a sheet metal web having a peripheral bead defining a peripheral recess internally of the brake drum and a terminal annular flange, said peripheral recess opening radially inwardly of the brake drum, a sheet metal ring encircling and extending beyond said flange, said ring having enlarged end portions providing longitudinally spaced shoulders internally of the brake drum facing away from each other, and a cast metal brake annulus within said bead, flange and ring and extending into and engaging said recess and said shoulders.

5. A composite brake drum comprising a sheet metal web having a peripheral flange provided with openings, a sheet metal ring encircling and extending beyond said flange and having an enlarged free end providing a shoulder internally of the brake drum facing away from said web, and a cast metal brake annulus within said flange and ring and having portions extending through said openings and fused to said ring and another portion fused to said shoulder.

6. A composite brake drum comprising a sheet metal web having a peripheral annular bead opening internally of the brake drum and a terminal annular flange formed with apertures, a sheet metal ring encircling and extending beyond said flange and having an enlarged free end providing a shoulder internally of the brake drum facing away from said web, and a cast metal brake annulus within said bead, flange and ring, said annulus having portions extending through said apertures and fused to said ring and other portions respectively fused to said shoulder and within and fused to said bead.

7. A brake drum comprising a shell having a web provided with a peripheral flange part, a ring having a part telescoping said flange part and extending beyond said flange part, and a cast metal brake annulus within said flange part and ring part and having a portion extending through an opening in one of said parts and fused to the other of said parts through said opening.

8. A brake drum comprising a shell having a web provided with a peripheral flange formed with circumferentially spaced openings, a ring telescoping and extending beyond said flange, and a cast metal brake annulus within said flange and ring and having portions extending through said openings and fused to said ring.

References Cited in the file of this patent

UNITED STATES PATENTS

| | | |
|---|---|---|
| 2,008,173 | Dake et al. | July 16, 1935 |
| 2,042,654 | Dostal | June 2, 1936 |
| 2,069,071 | Hunt et al. | Jan. 26, 1937 |
| 2,109,470 | Dake | Mar. 1, 1938 |